(12) United States Patent
Mushikabe et al.

(10) Patent No.: US 10,574,471 B2
(45) Date of Patent: Feb. 25, 2020

(54) DEVICE CONTROL METHOD, INFORMATION STORAGE MEDIUM, CONTROL APPARATUS, AND DEVICE CONTROL SYSTEM

(71) Applicant: Yamaha Corporation, Hamamatsu-shi, Shizuoka-ken (JP)

(72) Inventors: Kazuya Mushikabe, Hamamatsu (JP); Keisuke Tsukada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 158 days.

(21) Appl. No.: 15/716,937

(22) Filed: Sep. 27, 2017

(65) Prior Publication Data

US 2018/0019885 A1   Jan. 18, 2018

Related U.S. Application Data

(63) Continuation of application No. PCT/JP2016/068830, filed on Jun. 24, 2016.

(51) Int. Cl.
*G06F 1/26* (2006.01)
*H04L 12/12* (2006.01)
(Continued)

(52) U.S. Cl.
CPC .............. *H04L 12/12* (2013.01); *G06F 1/26* (2013.01); *H04L 12/10* (2013.01); *H04L 12/2809* (2013.01); *H04L 12/2821* (2013.01)

(58) Field of Classification Search
None
See application file for complete search history.

(56) References Cited

U.S. PATENT DOCUMENTS

| 2005/0123109 A1 | 6/2005 | Yamagishi et al. |
| 2008/0080500 A1* | 4/2008 | Shimura ................ H04L 12/12 370/389 |

(Continued)

FOREIGN PATENT DOCUMENTS

| JP | 2005-175625 A | 6/2005 |
| JP | 2008-295002 A | 12/2008 |

(Continued)

OTHER PUBLICATIONS

International Search Report (PCT/ISA/210) issued in PCT Application No. PCT/JP2016/068830 dated Aug. 30, 2016 with partial English-language translation (four (4) pages).

(Continued)

*Primary Examiner* — Fahmida Rahman
(74) *Attorney, Agent, or Firm* — Crowell & Moring LLP

(57) ABSTRACT

A device control method includes: identifying a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and switching, by sending by the second type of communication predetermined data that is based on the device information to the identified device, the identified device from the restriction mode to the controllable mode.

20 Claims, 9 Drawing Sheets

(51) Int. Cl.
*H04L 12/28* (2006.01)
*H04L 12/10* (2006.01)

(56) References Cited

U.S. PATENT DOCUMENTS

| | | | | |
|---|---|---|---|---|
| 2009/0133040 A1* | 5/2009 | Stevens, IV | ......... | G06F 1/3209 |
| | | | | 719/315 |
| 2012/0079296 A1 | 3/2012 | Ise et al. | | |
| 2012/0254613 A1* | 10/2012 | Nimura | ................ | G06F 1/3209 |
| | | | | 713/168 |
| 2013/0047014 A1* | 2/2013 | Ise | ....................... | G06F 3/1221 |
| | | | | 713/320 |

FOREIGN PATENT DOCUMENTS

| JP | 2011-151592 A | 8/2011 |
|---|---|---|
| JP | 2012-73894 A | 4/2012 |

OTHER PUBLICATIONS

Japanese-language Written Opinion (PCT/ISA/237) issued in PCT Application No. PCT/JP2016/068830 dated Aug. 30, 2016 with partial English-language translation (five (5) pages).
Japanese-language Office Action issued in counterpart Japanese Application No. 2018-523255 dated Jul. 23, 2019 with unverified English translation (four pages).

* cited by examiner

FIG.2

```
...
<friendlyName>C-XXX</friendlyName>
<manufacturer>Yamaha Corporation</manufacturer>
<modelDescription>BD Player</modelDescription>
<modelName>C-XXX</modelName>
<UDN>uuid:12345678-abcd-1111-ffff-001122334455</UDN>
</device>
<yamaha:X_device>
<yamaha:X_URLBase>http://192.168.0.100/</yamaha:X_URLBase>
...
<yamaha:X_magicPacketWakeSupported>1</yamaha:X_magicPacketWakeSupported>
<yamaha:X_macAddressWired>001122334455</yamaha:X_macAddressWired>
<yamaha:X_macAddressWireless>009988776655</yamaha:X_macAddressWireless>
<yamaha:X_fwVersion>1.00</yamaha:X_fwVersion>
<yamaha:X_destination>G</yamaha:X_destination>
<yamaha:X_featureExistence>Mediacenter,Setup</yamaha:X_featureExistence>
</yamaha:X_device>
...
```

40

41

US 10,574,471 B2

DEVICE CONTROL METHOD, INFORMATION STORAGE MEDIUM, CONTROL APPARATUS, AND DEVICE CONTROL SYSTEM

CROSS-REFERENCE TO RELATED APPLICATION

This application is a continuation of PCT International Application No. PCT/JP2016/068830, filed Jun. 24, 2016, the entire disclosure of which are herein expressly incorporated by reference in its entirety.

BACKGROUND OF THE INVENTION

1. Field of the Invention

The present invention relates to a device control method, an information storage medium, a control apparatus, and a device control system.

2. Description of the Related Art

There are known a network standby enabled device having a network standby function and a Wake-on-LAN (WOL) enabled device having a WOL function (for example, JP2011-151592A). The network standby enabled device can be in a standby mode in which the power consumption of the device is reduced while holding a communication function that is based on the TCP/IP protocol. Such a network standby enabled device holds the communication function even in the standby mode. Thus, although it is easy to switch the device from the standby mode to a normal power-on mode, the power consumption of the device may not be sufficiently reduced due to the fact that the device holds the communication function even in the standby mode. Whereas, the communication function that is based on the TCP/IP protocol is disabled in the WOL enabled device in the standby mode, and thus the power consumption of the device is reduced more than that of the network standby enabled device in the standby mode.

SUMMARY OF THE INVENTION

1. Technical Problem

However, it is necessary to send a predetermined packet, namely, a magic packet, in which a MAC address of a communication interface unit of the WOL enabled device is specified, in order to switch the WOL enabled device from the standby mode to the normal power-on mode. Thus, a user needs to look up the MAC address of the communication interface unit of the WOL enabled device in advance and input the MAC address to switch the WOL enabled device from the standby mode to the power-on mode. In this respect, it is difficult for a user who is not sufficiently familiar with network technologies to look up the MAC address of the communication interface unit of the WOL enabled device. Further, it is complicated even for a user who is familiar with network technologies to perform a procedure of looking up the MAC address of the communication interface unit of the WOL enabled device in advance and inputting the MAC address.

2. Solution to Problem

The present invention has been made in view of the above-mentioned problems, and an object thereof is to provide a device control method, an information storage medium, a control apparatus, and a device control system that are capable of easily switching, for example, a WOL enabled device from a standby mode to a normal power-on mode.

In order to solve the above-mentioned problems, a device control method according to one embodiment of the present invention is a device control method including: identifying a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and switching, by sending by the second type of communication predetermined data that is based on the device information to the identified device, the identified device from the restriction mode to the controllable mode.

Further, a program according to one embodiment of the present invention is a program for causing a computer to: identify a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and switch, by sending by the second type of communication predetermined data that is based on the device information to the identified device, the identified device from the restriction mode to the controllable mode.

Further, an information storage medium according to one embodiment of the present invention is a non-transitory computer-readable information storage medium having the above-mentioned program recorded thereon.

Further, a control apparatus according to one embodiment of the present invention is a control apparatus including: an identification unit configured to identify a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and a mode control unit configured to switch, by sending by the second type of communication predetermined data that is based on the device information to the identified device, the identified device from the restriction mode to the controllable mode.

Further, a device control system according to one embodiment of the present invention is a device control system including: an identification unit configured to identify a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and a mode control unit configured to switch, by sending by the second type of communication predetermined data that is based on the device information to the identified devices, the identified device from the restriction mode to the controllable mode.

BRIEF DESCRIPTION OF THE DRAWINGS

FIG. 2 is a diagram for illustrating an example of device specific information.

DETAILED DESCRIPTION OF THE INVENTION

Figure 1:
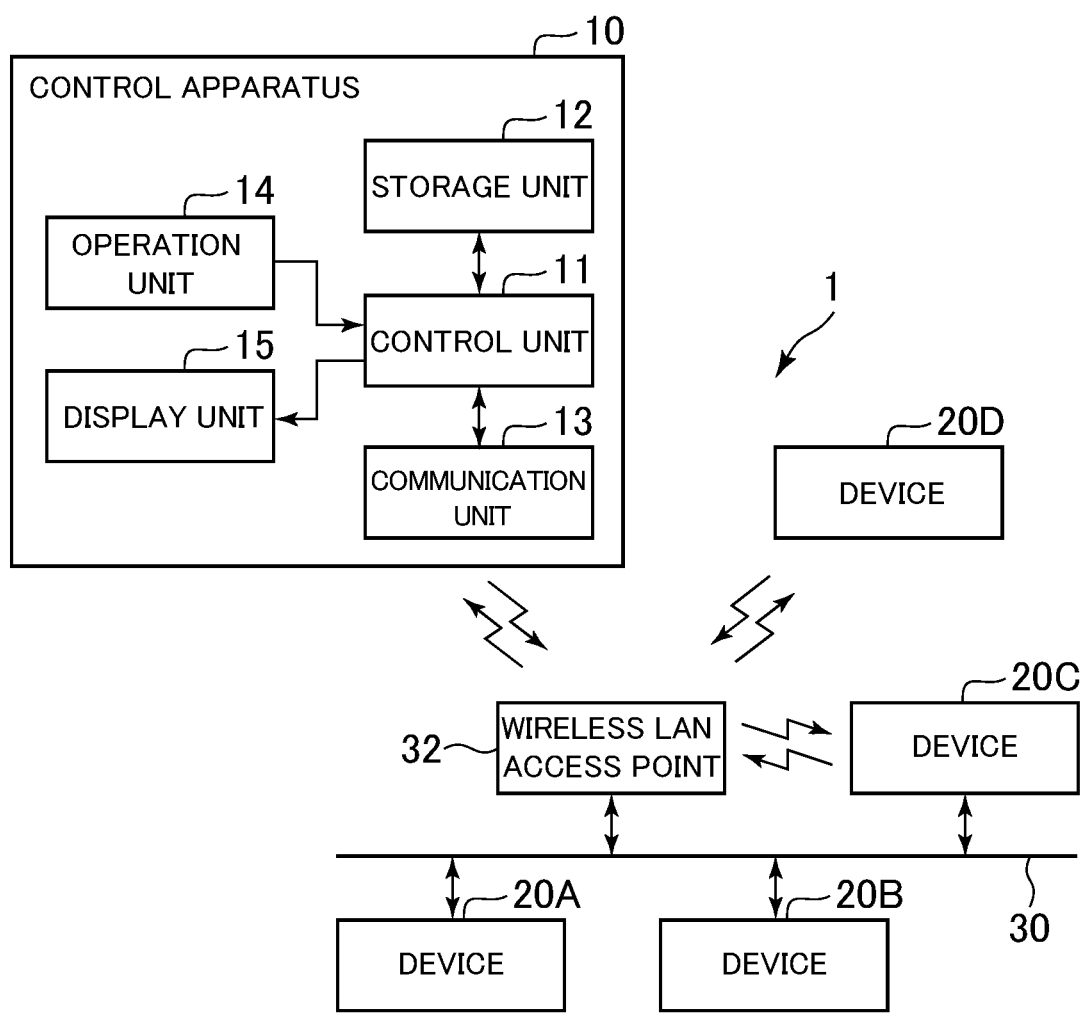
FIG. 1 is a diagram for illustrating an example of configuration of a device control system including a control apparatus according to an embodiment of the present invention.

An embodiment of the present invention is described below with reference to the drawings. In the drawings, the same or equivalent elements are denoted by the same reference symbols, and a redundant description is omitted.

FIG. 1 is a diagram for illustrating an example of configuration of a device control system 1 including a control apparatus 10 according to an embodiment of the present invention. As illustrated in FIG. 1, the device control system 1 includes the control apparatus 10 and devices 20A, 20B, 20C, and 20D. In the example illustrated in FIG. 1, the device control system 1 includes the four devices 20A to 20D. However, the device control system 1 may include three or less devices, or may include five or more devices.

The control apparatus 10 is configured to control the devices 20A to 20D via a network, and is used by a user to control the devices 20A to 20D. The control apparatus 10 is implemented by, for example, a smartphone, a tablet computer, a laptop computer, a desktop computer, or the like. The control apparatus 10 is not necessarily implemented by such a general-purpose device, and may be implemented by a dedicated device.

As illustrated in FIG. 1, the control apparatus 10 includes a control unit 11, a storage unit 12, a communication unit 13, an operation unit 14, and a display unit 15. The control unit 11 includes one or more microprocessors, and executes processing in accordance with a program stored in the storage unit 12. The storage unit 12 includes information storage media such as a main memory (e.g., RAM or the like) and an auxiliary memory (e.g., hard disk drive, solid state drive, or the like), and stores a program to be executed by the control unit 11. The storage unit 12 also operates as a working memory of the control unit 11.

Programs, data, and other pieces of information are provided to the control apparatus 10 via a network. The control apparatus 10 may include a component for reading programs and data stored in a computer-readable information storage medium, such as a memory card, an optical disc, or the like. Then, those programs and data may be provided to the control apparatus 10 via the information storage medium. In other words, programs for executing processing illustrated in FIG. 6, FIG. 7, FIG. 8A, and FIG. 8B described later may be provided via a network, or may be stored in an information storage medium for provision.

The communication unit 13 is configured to communicate data to/from another apparatus via a network. For example, the communication unit 13 includes a wireless communication interface unit for performing communication via a wireless LAN, and as illustrated in FIG. 1, the control apparatus 10 can perform wireless communication with a wireless LAN access point 32 connected to a wired LAN 30, and perform communication with the devices 20A to 20D via the wireless LAN access point 32 and the wired LAN 30. The communication unit 13 may include a wired communication interface unit for performing communication via a wired LAN.

The operation unit 14 is used by the user to perform various kinds of operations. The display unit 15 is, for example, a liquid crystal display or an organic EL display, and is configured to display a screen in accordance with an instruction from the control unit 11. In FIG. 1, the operation unit 14 and the display unit 15 are illustrated in a separate manner, but the operation unit 14 and the display unit 15 may be constructed integrally as a so-called touch panel. In this case, the user can perform various kinds of operations by touching the touch panel with a finger, a touch pen, or the like. As the touch panel, various types of touch panels can be used such as an electrostatic capacitive coupling type for detecting a change in capacitance of a touched part, a resistive film type for detecting a change in resistance value, or an optical sensor type for detecting a change in light amount at a part covered by touch.

In the following, it is mainly assumed that the control apparatus 10 is implemented by a smartphone or a tablet computer including a touch panel. The operation unit 14 and the display unit 15 are not necessarily constructed integrally as a touch panel, and the operation unit 14 may be an operation component provided separately from the display unit 15, such as a button, a key, a lever (stick), a mouse, a trackpad, or the like.

The devices 20A to 20D are devices to be controlled by the control apparatus 10. In other words, the user uses the control apparatus 10 to control the devices 20A to 20D. For example, the devices 20A to 20D are audio devices or audio visual devices. Specifically, the devices 20A to 20D are, for example, Blu-ray Disc players, amplifiers, or the likes, and the control apparatus 10 is used to perform an operation such as an instruction for reproduction of content, an adjustment of volume, or the like. In the following, a description is given on the assumption that the devices 20A to 20D are audio devices or audio visual devices, but the devices 20A to 20D are not limited to audio devices or audio visual devices, and may be devices for other purposes.

The devices 20A to 20D each include at least one of a wired communication interface unit or a wireless communication interface unit. In the example illustrated in FIG. 1, the devices 20A to 20C each include a wired communication interface unit, and the devices 20A to 20C are connected to the wired LAN 30. Further, the devices 20C and 20D each include a wireless communication interface unit, and can perform wireless communication with the wireless LAN access point 32. The devices 20A to 20D can each perform communication based on the IP protocol (TCP/IP protocol).

Further, the devices 20A to 20D are each a Universal Plug and Play (UPnP) enabled device having a UPnP function. The fact the devices 20A to 20D each have the UPnP function enables the devices 20A to 20D to communicate with another apparatus without necessitating complicated setting when connected to the network. Further, the fact that the devices 20A to 20D each have the UPnP function enables the control apparatus 10 to confirm presence of the devices 20A to 20D, acquire information on the devices 20A to 20D (e.g., modes and functions of the device 20A), operate the devices 20A to 20D, and utilize the functions of the devices 20A to 20D.

For example, when the control apparatus 10 sends an IP broadcast packet (M-search) for inquiring about presence of a UPnP enabled device on the network, which is specified by the UPnP protocol, to the network (wired LAN 30 and wireless LAN), the devices 20A to 20D serving as UPnP enabled devices each send a response to the control apparatus 10. In this case, for example, device specific information for indicating information specific to each device is sent to the control apparatus 10 as a response.

FIG. 2 is a diagram for illustrating an example of the device specific information. FIG. 2 is an illustration of an example of the device specific information to be sent to the control apparatus 10 from the device 20C as a response. As illustrated in FIG. 2, the device specific information indicates information such as a model name, a manufacturer, and the like of the device 20C in an XML format. The device specific information contains a first part 40 and a second part 41. The first part 40 indicates an item prespecified by the UPnP protocol, and the second part 41 indicates an item added by the manufacturer of the device 20C based on the UPnP protocol. The item "modelName" in the first part 40 indicates a model name, and the item "UDN" indicates a UUID serving as identification information for uniquely identifying individual devices. Even when there are devices having the same model name (C-XXX), UUIDs of individual devices are different from one another. Further, the item "yamaha:X_macAddressWired" in the second part 41 indicates a MAC address of the wired communication interface unit. Further, the item "yamaha:X_macAddress-Wireless" indicates the MAC address of the wireless communication interface unit. Further, the item "yamaha:X_fwVersion" indicates the version of firmware, the item "yamaha:X_destination" indicates a destination region, and the item "yamaha:X_featureExistence" indicates a function of the device. The item "yamaha:X_magicPacketWakeSupported" is described later.

The devices 20A to 20D include a Wake-on-LAN (WOL) enabled device (example of "first device") having a WOL function and a network standby enabled device (example of "second device") having a network standby function. In the following, a description is given on the assumption that the devices 20A and 20B are network standby enabled devices, and the devices 20C and 20D are WOL enabled devices.

The network standby enabled device is allowed to be in a normal power-on mode (example of "controllable mode") and a standby mode (example of "second restriction mode"). For example, when the network standby enabled device is not used for a certain period of time, the network standby enabled device changes from the power-on mode to the standby mode in order to reduce power consumption. In the standby mode, power supply to the network standby enabled device is restricted, and entire power consumption of the device is reduced compared to the power-on mode. That is, in the standby mode, power supply relating to functions other than the communication function is restricted, and usage of functions other than the communication function is restricted, to thereby reduce entire power consumption of the device.

Similarly to the power-on mode, the network standby enabled device in the standby mode can perform communication via the IP protocol (communication at layer 3 or higher layers). That is, a state of an IP address assigned to the wired communication interface unit or the wireless communication interface unit is maintained, which means that the device is present in the IP network.

In the standby mode of the network standby enabled device, the UPnP function is also enabled. In the UPnP function, the TCP/IP protocol is used as the communication protocol, and the network standby enabled device can perform communication via the TCP/IP protocol (example of "first type of communication") in both of the power-on mode and the standby mode. Thus, in both of the power-on mode and the standby mode, the control apparatus 10 can confirm presence of the network standby enabled device, acquire information on the network standby enabled device, and control the network standby enabled device based on communication via the TCP/IP protocol. For example, the control apparatus 10 can switch the network standby enabled device from the standby mode to the power-on mode based on communication via the TCP/IP protocol.

Meanwhile, the WOL enabled device is also allowed to be in the normal power-on mode (example of "controllable mode") and the standby mode (example of "restriction mode" and "first restriction mode"). In the standby mode, entire power consumption of the device is reduced compared to the normal power-on mode. However, unlike the standby mode of the network standby enabled device, the communication function of the WOL enabled device is also restricted in the standby mode, and thus power consumption is reduced more compared to the standby mode of the network standby enabled device.

In other words, unlike the standby mode of the network standby enabled device, power supply to the WOL enabled device is restricted in the standby mode of the WOL enabled device, and thus communication via the IP protocol (communication at layer 3 or higher layers) is prohibited. That is, an IP address is not assigned to the wired communication interface unit or the wireless communication interface unit in the standby mode of the WOL enabled device, which means that the device is not present in the IP network. As a result, the UPnP function is disabled in the standby mode of the WOL enabled device.

When the WOL enabled device is in the power-on mode, the WOL enabled device can perform communication via the TCP/IP protocol, and thus the control apparatus 10 can confirm presence of the WOL enabled device, acquire information on the WOL enabled device, and control the WOL enabled device. Whereas, as described above, when the WOL enabled device is in the standby mode, the WOL enabled device cannot perform communication via the TCP/IP protocol, and thus the control apparatus 10 cannot confirm presence of the WOL enabled device, acquire information on the WOL enabled device, or control the WOL enabled device based on communication via the TCP/IP protocol.

The communication interface unit (wired communication interface unit or wireless communication interface unit) of the WOL enabled device in the standby mode is supplied with a necessary amount of electric power, which enables communication at layer 2 (example of "second type of communication"). In other words, the communication interface can receive packets addressed to the own MAC address, and when the communication interface receives a specific packet called a magic packet, in which the own MAC address is specified, the WOL enabled device switches from the standby mode to the power-on mode. The "magic packet" is a packet in which "FF:FF:FF:FF:FF:FF" (broadcast address of layer 2) is set as a destination address and the MAC address of the communication interface is repeated 16 times.

The item "yamaha:X_magicPacketWakeSupported" in the second part 41 of the device specific information illustrated in FIG. 2 indicates whether or not the subject device is a WOL enabled device. In other words, the item indicates whether or not it is possible to switch the device from the standby mode to the normal power-on mode with a magic packet. For example, the value of "0" or "1" is set in the item. The value of "0" indicates that the device is not a WOL enabled device, whereas the value of "1" indicates that the device is a WOL enabled device.

In the device control system 1, the user can use the control apparatus 10 to operate the devices 20A to 20D. For example, even when the device 20C, which is a WOL enabled device, is in the standby mode, it is possible to switch the device 20C from the standby mode to the power-on mode with a magic packet, and the user can start operation of the device 20C. However, it has hitherto been necessary for the user to look up the MAC address of the communication interface of the WOL enabled device in advance and input the MAC address to switch the WOL enabled device from the standby mode to the power-on mode with the magic packet. In this respect, it is difficult for a user who is not sufficiently familiar with network technologies to look up the MAC address of the communication interface. Further, it is complicated even for a user who is familiar with network technologies to perform a procedure of looking up the MAC address of the communication interface in advance and inputting the MAC address.

In order to address this issue, the device control system 1 (control apparatus 10) is configured to enable the user to easily start operation of the WOL enabled device in the standby mode. In the following, a detailed description is given of this point with the standby mode of the network standby enabled device and the standby mode of the WOL enabled device being described as "network standby mode" and "WOL standby mode", respectively, for the sake of convenience in order to distinguish between those standby modes. Further, in the following, the devices 20A to 20D may be collectively referred to as "device 20".

Figure 3:
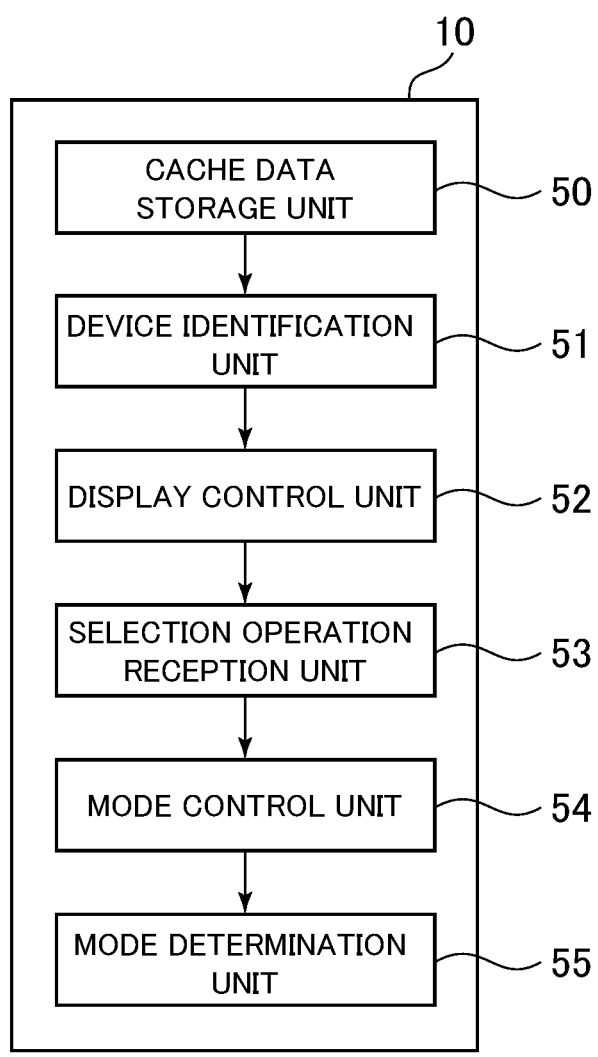
FIG. 3 is a functional block diagram of the control apparatus.

FIG. 3 is a functional block diagram for mainly illustrating functions that are implemented by the control apparatus 10 and relate to the present invention. As illustrated in FIG. 3, the control apparatus 10 includes a cache data storage unit 50, a device identification unit 51, a display control unit 52, a selection operation reception unit 53, a mode control unit 54, and a mode determination unit 55.

The cache data storage unit 50 is implemented by, for example, the storage unit 12. The cache data storage unit 50 stores device information on the device 20 that was in the power-on mode in the past. Specifically, the cache data storage unit 50 stores cache data (example of "device information") of a list of the devices 20 that were in the power-on mode in the past.

Figure 4:
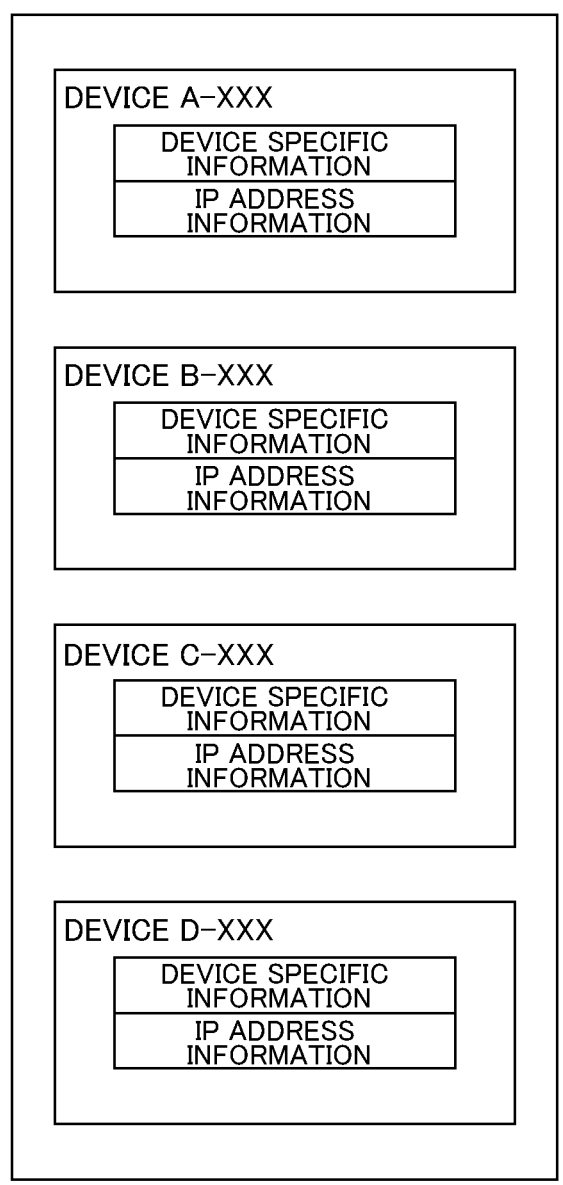
FIG. 4 is a diagram for illustrating an example of cache data.

FIG. 4 is a diagram for illustrating an example of cache data stored in the cache data storage unit 50. "A-XXX", "B-XXX", "C-XXX", and "D-XXX" in FIG. 4 indicate the model names of the device 20A, the device 20B, the device 20C, and the device 20D, respectively, and cache data illustrated in FIG. 4 contains information on each of the devices 20A to 20D. The information on each of the devices 20A to 20D contains, for example, the device specific information (refer to FIG. 2) on the device 20, which was acquired from the device 20 when the device 20 was in the power-on mode in the past, or IP address information on an IP address that was assigned to the device 20 when the device 20 was in the power-on mode in the past.

The cache data storage unit 50 may be implemented by another storage apparatus that can be accessed by the control apparatus 10. For example, the above-mentioned cache data may be stored in a storage apparatus on the Internet (so-called cloud).

Figure 5:
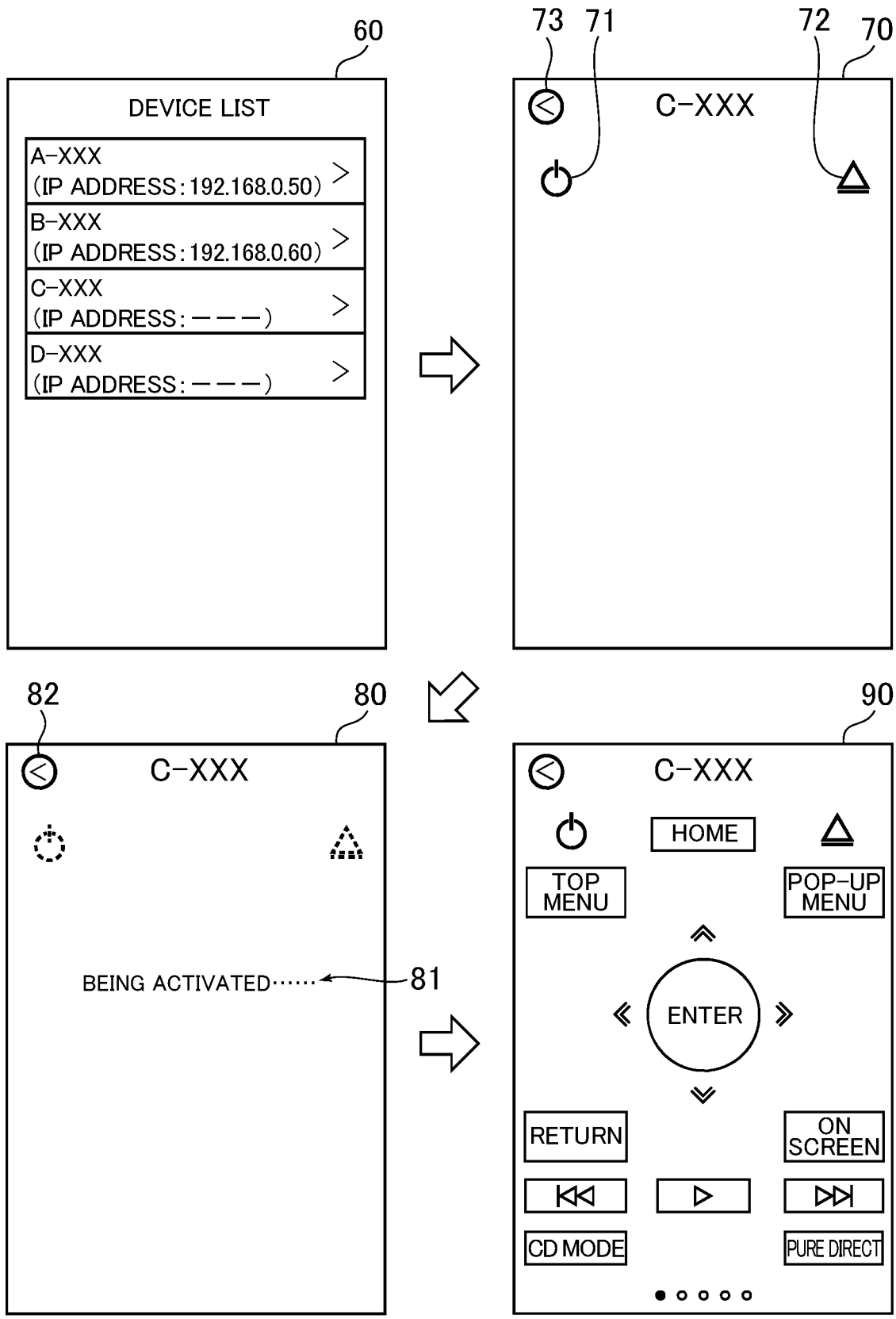
FIG. 5 is a diagram for illustrating an example of transition of a screen.

The device identification unit 51, the display control unit 52, the selection operation reception unit 53, the mode control unit 54, and the mode determination unit 55 are mainly implemented by the control unit 11. That is, the control unit 11 executes processing in accordance with programs to function as those function blocks. FIG. 5 is a diagram for illustrating an example of transition of a screen displayed on the display unit 15. In the following, a description is given of those function blocks with reference to FIG. 5.

The device identification unit 51 identifies, based on cache data stored in the cache data storage unit 50, the device 20 contained in the cache data.

For example, the device identification unit 51 identifies the device 20 (WOL enabled device) that is contained in the cache data and that is currently in the WOL standby mode (the device 20 that was in the power-on mode in the past and is currently in the WOL standby mode) in the following manner.

First, the device identification unit 51 identifies the device 20 (network standby enabled device or WOL enabled device) that is currently in the power-on mode and the device 20 (network standby enabled device) that is currently in the network standby mode.

For example, the device identification unit 51 executes ping commands for IP addresses of the individual devices 20 registered in the cache data to send echo requests (example of "predetermined request") to the individual devices 20, and receives responses sent from the individual devices 20 in response to the echo requests, to thereby identify the devices 20 that are currently in the power-on mode or the network standby mode.

Alternatively, for example, the device identification unit 51 sends, to the network, an IP broadcast packet for inquiring about presence of a UPnP enabled device on the network (example of "predetermined request"), which is a so-called M-search specified in the UPnP protocol, and receives responses sent from the respective devices 20 in response to the IP broadcast packet, to thereby identify the devices 20 that are currently in the power-on mode or the network standby mode.

The devices 20 that is currently in the power-on mode or the network standby mode can perform communication via the IP protocol, and thus sends a response to the echo request or the IP broadcast packet to the control apparatus 10. This means that the device 20 that has sent a response is the device 20 that is currently in the power-on mode or the network standby mode. Therefore, with the above-mentioned methods, the device identification unit 51 identifies the device 20 that is currently in the power-on mode or the network standby mode, and acquires a list of the devices 20 that are currently in the power-on mode or the network standby mode. Any one or both of the methods described above may be used, and the risk of not identifying all of the devices 20 in the power-on mode or the network standby mode can be reduced by using both methods.

Whereas, the device 20 in the WOL standby mode cannot perform communication via the IP protocol, and thus cannot send a response to the echo request or the IP broadcast packet to the control apparatus 10. As a result, the above-mentioned methods do not enable identification of the device 20 that is currently in the WOL standby mode. In view of this, the device identification unit 51 identifies the device 20 that is currently in the WOL standby mode based on the cache data stored in the cache data storage unit 50. Specifically, the device identification unit 51 identifies the device 20 that is the WOL enabled device registered in the cache data and that is not contained in the above-mentioned list (the device 20 that is the WOL enabled device which was in the power-on mode in the past and that has not sent above-mentioned responses to the control apparatus 10). In this manner, the device identification unit 51 identifies the device 20 that is currently in the WOL standby mode.

The display control unit 52 displays information on the device 20, which is identified by the device identification unit 51, on the display unit 15 based on the cache data stored in the cache data storage unit 50. Specifically, the display control unit 52 displays, on the display unit 15, the information on the device 20 that is currently in the WOL standby mode, which is identified by the device identification unit 51. The display control unit 52 may also display information on the device 20 that is currently in the power-on mode or the network standby mode on the display unit 15.

For example, the display control unit 52 displays a device list screen 60 as illustrated in FIG. 5 on the display unit 15. The device 20A (A-XXX), the device 20B (B-XXX), the device 20C (C-XXX), and the device 20D (D-XXX) are displayed on the device list screen 60 illustrated in FIG. 5.

The device 20 that is currently in the power-on mode or the network standby mode can perform communication via the TCP/IP protocol, and thus has an IP address assigned to its communication interface. Therefore, regarding this device 20, the IP address is displayed on the device list screen 60. In the device list screen 60 illustrated in FIG. 5, the IP addresses of the devices 20A and 20B are displayed, and it is indicated that the devices 20A and 20B are currently in the power-on mode or the network standby mode.

Whereas, the device 20 that is currently in the WOL standby mode cannot perform communication via the TCP/IP protocol, and thus does not have an IP address assigned to its communication interface. Therefore, regarding this devices 20, the IP address is not displayed on the device list screen 60. In the device list screen 60 illustrated in FIG. 5, the IP addresses of the devices 20C and 20D are not displayed, and it is indicated that the devices 20C and 20D are currently in the WOL standby mode.

The selection operation reception unit 53 receives a selection operation for selecting the device 20 that is displayed on the display unit 15 as a control target. For example, the selection operation reception unit 53 receives a selection operation for selecting any one of the devices 20 that are displayed on the device list screen 60 as the control target.

For example, the user touches the touch panel with a finger or a touch pen to select any one of the devices 20 that are displayed on the device list screen 60 as the control target (device to be operated). The selection operation reception unit 53 receives this selection operation, and identifies the device 20 that is selected by the user as the control target.

The mode control unit 54 switches the device 20 identified by the device identification unit 51 from the WOL standby mode to the power-on mode. For example, when the device 20 in the WOL standby mode that is identified by the device identification unit 51 is selected as the control target, the mode control unit 54 switches the device 20 from the WOL standby mode to the power-on mode.

When the device 20 selected by the user as the control target is in the WOL standby mode, an activation instruction screen 70 as illustrated in FIG. 5 is displayed. The activation instruction screen 70 is a screen for switching the device 20 from the WOL standby mode to the power-on mode. The activation instruction screen 70 illustrated in FIG. 5 is based on the assumption that the device 20C in the WOL standby mode is selected as the control target. Similarly, in the following, a description is given on the assumption that the device 20C is selected as the control target.

As illustrated in FIG. 5, the activation instruction screen 70 includes a power button 71 and an open button 72. The power button 71 is a button for instructing the device 20 to switch to the power-on mode. The open button 72 is displayed when the device 20 including a disc tray, for example, a Blu-ray Disc player, is selected as the control target. The open button 72 is a button for instructing the device 20 to switch to the power-on mode and to open the disc tray. The activation instruction screen 70 also includes a back button 73. The back button 73 is a button for returning to the previous screen (device list screen 60).

When the power button 71 is selected by the user, an activation screen 80 as illustrated in FIG. 5 is displayed on the display unit 15. As illustrated in FIG. 5, the activation screen 80 displays a message 81 (or image) for indicating the fact that the device 20C is being activated, namely, the fact that the device 20C is switching to the power-on mode. The activation screen 80 also includes a back button 82 for returning to the previous screen (activation instruction screen 70).

Further, when the power button 71 is selected by the user, the mode control unit 54 sends a magic packet for the device 20C (example of "predetermined data" and "first predetermined data") to switch the device 20C from the WOL standby mode to the power-on mode. As described above, the magic packet is sent via communication at layer 2. Further, the magic packet is sent (generated) based on the cache data stored in the cache data storage unit 50. In other words, information necessary for sending the magic packet to the device 20C is stored in the cache data and acquired from the cache data. For example, the MAC address of the device 20C is necessary to send the magic packet to the device 20C. In this respect, the MAC address of the device 20C is stored in the cache data and acquired from the cache data.

Specifically, the mode control unit 54 first determines whether or not the device 20C includes a wired communication interface unit (wired communication function) based on the cache data stored in the cache data storage unit 50. When the device 20C includes a wired communication interface unit, the mode control unit 54 acquires the MAC address of the wired communication interface unit of the device 20C from the cache data. Then, the mode control unit 54 generates and sends the magic packet based on the acquired MAC address. Specifically, the mode control unit 54 generates and sends a magic packet in which "FF:FF:

FF:FF:FF:FF" (broadcast address of layer 2) is set as the destination address and the acquired MAC address is repeated 16 times.

Further, the mode control unit 54 determines whether or not the device 20C includes a wireless communication interface unit (wireless communication function) based on the cache data stored in the cache data storage unit 50. When the device 20C includes a wireless communication interface unit, the mode control unit 54 acquires the MAC address of the wireless communication interface unit of the device 20C from the cache data. Then, the mode control unit 54 generates and sends the magic packet based on the acquired MAC address.

When the device 20C includes both of the wired communication interface unit and the wireless communication interface unit, the mode control unit 54 sends a magic packet for each of the wired communication interface unit and the wireless communication interface unit of the device 20C.

When the wired communication interface unit of the device 20C receives the magic packet, the wired communication interface unit determines whether or not the MAC address contained in the magic packet is the same as the own MAC address. Then, when the MAC address contained in the magic packet is the same as the own MAC address, a signal for switching the device 20C to the power-on mode is supplied to the device 20C by the wired communication interface, and as a result, the device 20C switches from the WOL standby mode to the power-on mode. Whereas, when the MAC address contained in the magic packet is not the same as the own MAC address, the magic packet is discarded, and the device 20C maintains the WOL standby mode.

The wireless communication interface unit of the device 20C executes similar processing also when the wireless communication interface unit receives the magic packet.

As described above, when the device 20C includes both of the wired communication interface unit and the wireless communication interface unit, the magic packet is sent to each of those communication interface units. In this case, the communication interface unit that has received the magic packet first among those communication interface units switches the device 20C to the power-on mode.

The mode determination unit 55 determines whether or not the device 20C has successfully switched to the power-on mode after the magic packet is sent to the device 20C.

For example, the mode determination unit 55 sends a predetermined request for requesting transmission of a response to each of the devices 20 connected to the network, and receives a response sent from each of the devices 20. Specifically, the mode determination unit 55 sends, to the network, an IP broadcast packet (example of "predetermined request") for inquiring about presence of a UPnP enabled device on the network, which is a so-called M-search specified in the UPnP protocol, and receives a response sent from each of the devices 20 in response to the IP broadcast packet. The IP broadcast packet and the responses from the respective devices 20 are sent/received via communication at layer 3 or higher layers.

Then, the mode determination unit 55 determines whether or not a response is received from the device 20C. When the IP broadcast packet is sent to the network, all the UPnP enabled devices connected to the network send a response. The response in this case contains device specific information as illustrated in FIG. 2, and thus the mode determination unit 55 determines whether or not the response is a response from the device 20C by comparing the UUID indicated by the device specific information contained in the received response with the UUID of the device 20C registered in the cache data.

As described above, the UPnP function uses the TCP/IP protocol as the communication protocol. The device 20C in the WOL standby mode cannot perform communication via the TCP/IP protocol, but after switching to the normal power-on mode, the device 20C can perform communication via the TCP/IP protocol. Thus, reception of the response from the device 20C means that the device 20C has finished switching to the power-on mode. Therefore, when the response is received from the device 20C, the mode determination unit 55 determines that the device 20C has switched to the power-on mode. Whereas, when no response has been received from the device 20C, the mode determination unit 55 determines that the device 20C has not switched to the power-on mode.

When it is determined that the device 20C has switched to the power-on mode, for example, an operation screen 90 as illustrated in FIG. 5 is displayed on the display unit 15. The operation screen 90 is a screen on which the user operates the device 20C. Thus, the user can operate the device 20C via the operation screen 90. The operation screen 90 illustrated in FIG. 5 assumes that the device 20C is a Blu-ray Disc player. For example, the operation screen 90 is set to resemble a remote controller of the device 20C. The display content of the operation screen 90 is set depending on the device 20 to be operated (to be controlled).

The description given above is based on the assumption that the device 20C in the WOL standby mode is selected on the device list screen 60 as the control target, but when the device 20 (network standby enabled device) in the network standby mode is selected as the control target, the mode control unit 54 sends predetermined data (example of "second predetermined data") to the device 20 based on communication via the TCP/IP protocol, to thereby switch the device 20 from the network standby mode to the power-on mode.

Next, a description is given of an example of processing (device control method) to be executed by the control apparatus 10.

Figure 6:
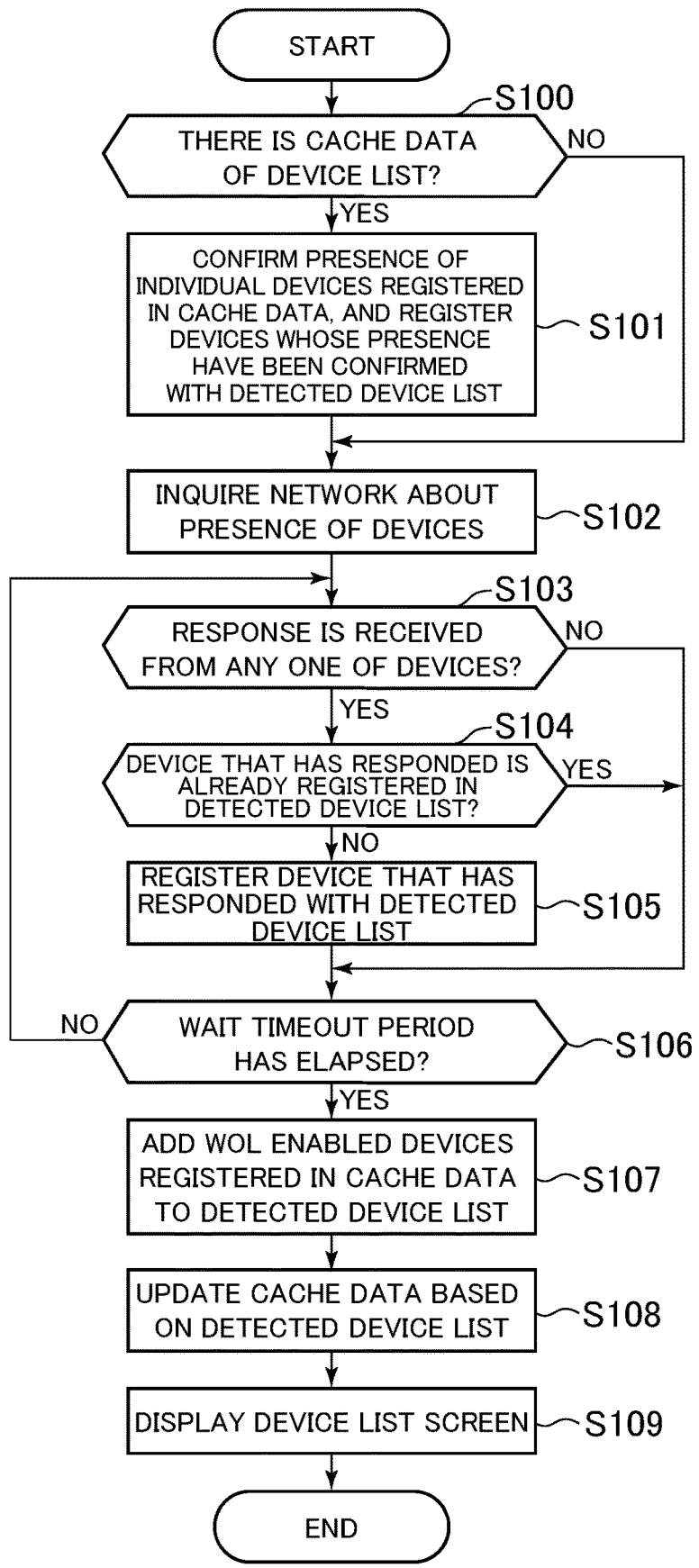
FIG. 6 is a flowchart for illustrating an example of processing to be executed by the control apparatus.

First, a description is given of processing to be executed by the control apparatus 10 when the device list screen 60 is displayed. FIG. 6 is a flowchart for illustrating an example of the processing. The device identification unit 51 and the display control unit 52 are implemented by the control unit 11 executing the processing illustrated in FIG. 6 in accordance with a program stored in the storage unit 12.

As illustrated in FIG. 6, the control unit 11 first determines whether or not there is cache data of the device list (S100). Specifically, the control unit 11 determines whether or not the cache data as illustrated in FIG. 4 is stored in the storage unit 12.

When there is the cache data, the control unit 11 confirms presence of the individual devices 20 registered in the cache data, and registers the devices 20 whose presence have been confirmed with the detected device list (S101).

For example, the control unit 11 reads an IP address of the device 20 registered in the cache data from the cache data, executes a ping command for the IP address of the device 20 to send an echo request to the device 20, and determines whether or not a response is received from the device 20. When the response is received from the device 20, the control unit 11 determines that presence of the device 20 is confirmed, and registers the device 20 with the detected device list. Whereas, when no response has been received from the device 20, the control unit 11 determines that presence of the device 20 is not confirmed, and does not register the device 20 with the detected device list. The detected device list has the same data configuration as the device list stored as, for example, the cache data (refer to FIG. 4).

The device 20 whose presence can be confirmed in Step S101 is the device 20 that is registered in the cache data (namely, the device 20 that has communicated with the control apparatus 10 in the past) and that is currently in the power-on mode or the network standby mode with the same IP address as that registered in the cache data (namely, the IP address of when the device 20 communicated with the control apparatus 10 in the past) being currently assigned. Thus, such devices 20 are registered in the detected device list at the time of completion of Step S101.

After the execution of Step S101, or when it is determined that there is not the cache data in Step S100, the control unit 11 inquires the network about presence of the devices 20 (S102). Specifically, the control unit 11 sends an IP broadcast packet (M-search) for inquiring about presence of a UPnP enabled device on the network, which is specified in the UPnP protocol, to the network. The UPnP enabled device that has received the packet (M-search) sends a response to the control apparatus 10. Thus, the control unit 11 performs monitoring to determine whether or not a response is received from any one of the devices 20 (S103).

When a response is received from any one of the devices 20, the control unit 11 determines whether or not the device 20 is already registered in the detected device list (S104). This determination is performed by comparing the UUID indicated by the device specific information contained in the response from the device 20 with the UUIDs of the individual devices 20 registered in the detected device list. When it is not determined that the UUID indicated by the device specific information contained in the response is the same as any of the UUIDs of the devices 20 registered in the detected device list, the control unit 11 determines that the device 20 is not registered in the detected device list.

When the device 20 is not registered in the detected device list, the control unit 11 registers the device 20 with the detected device list (S105). After that, the control unit 11 determines whether or not a wait timeout period has elapsed (S106). Specifically, the control unit 11 determines whether or not a period of time elapsed since Step S102 is executed is equal to or more than the wait timeout period. In addition, when it is determined that the device 20 is already registered in the detected device list in Step S104, or when it is determined that no response has been received from any one of the devices 20 in Step S103, the control unit 11 determines whether or not the wait timeout period has elapsed (S106).

When the wait timeout period has not elapsed, the control unit 11 continues to perform monitoring to determine whether or not a response is received from any one of the devices 20 (S103). Whereas, when the wait timeout period has elapsed, the control unit 11 stops waiting for a response from any one of the devices 20.

In Steps S102 to S106, the device 20 that is currently in the power-on mode or the network standby mode, but whose presence is not confirmed in Step S101 is additionally registered in the detected device list. An example of the device 20 that is additionally registered in the detected device list is (1) the device 20 that is not registered in the cache data (namely, the device 20 that has not communicated with the control apparatus 10 in the past) and is currently in the power-on mode or the network standby mode, or (2) the device 20 that is registered in the cache data and is currently in the power-on mode or the network standby mode, but is currently assigned with IP address different from that registered in the cache data.

Figure 7:
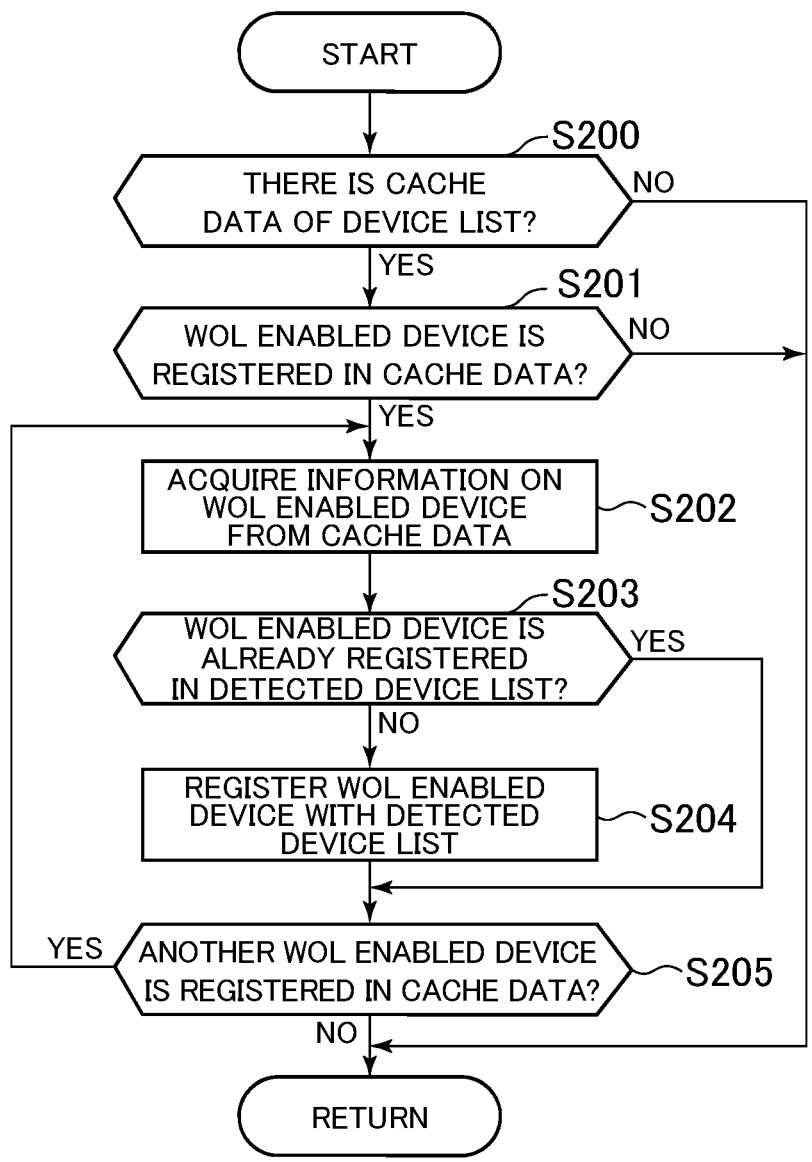
FIG. 7 is a flowchart for illustrating an example of other processing to be executed by the control apparatus.

When the wait timeout period has elapsed, the control unit executes processing of registering WOL enabled devices registered in the cache data with the detected device list (S107). FIG. 7 is a flowchart for illustrating an example of the processing of Step S107.

As illustrated in FIG. 7, the control unit 11 first determines whether or not there is cache data of the device list (S200). This processing is similar to Step S100 of FIG. 6.

When there is no cache data of the device list, the control unit 11 ends the processing and executes Step S108 of FIG. 6. Whereas, when there is cache data of the device list, the control unit 11 determines whether or not a WOL enabled device is registered in the cache data (S201). Whether or not the device 20 registered in the cache data is a WOL enabled device can be determined by referring to the item "yamaha: X_magicPacketWakeSupported" of device specific information (refer to FIG. 2) contained in the cache data.

When a WOL enabled device is registered in the cache data, the control unit 11 acquires information on the WOL enabled device from the cache data (S202). Then, the control unit 11 determines whether or not the WOL enabled device is already registered in the detected device list (S203). This determination is performed by comparing the UUID registered in the information acquired in Step S202 with the UUIDs of the individual devices 20 registered in the detected device list. When it is not determined that the UUID registered in the information acquired in Step S202 is the same as any of the UUIDs of the devices 20 registered in the detected device list, the control unit 11 determines that the WOL enabled device is not registered in the detected device list. When the WOL enabled device is not registered in the detected device list, the control unit 11 registers the WOL enabled device with the detected device list (S204).

After the execution of Step S204, or when it is determined that the WOL enabled device is registered in the detected device list in Step S203, the control unit 11 determines whether or not another WOL enabled device is registered in the cache data (S205). When another WOL enabled device is registered in the cache data, the control unit 11 acquires information on the WOL enabled device from the cache data (S202), and executes processing of Steps S203 to S205 again. Whereas, when another WOL enabled device is not registered in the cache data, the control unit 11 ends the processing, and executes Step S108 of FIG. 6.

After the execution of Step S107, the control unit 11 updates the cache data based on the detected device list (S108). For example, when there is the device 20 that is not registered in the cache data among the devices 20 registered in the detected device list, the control unit 11 adds information on the device 20 to the cache data. Further, for example, when the IP address of the device 20 registered in the detected device list is different from that of the same device 20 registered in the cache data, the control unit 11 replaces the IP address of the device 20 registered in the cache data with that of the same device 20 registered in the detected device list.

After the execution of Step S108, the control unit 11 displays the device list screen 60 on the display unit 15 (S109). In this case, the control unit 11 displays a list of the devices 20 registered in the detected device list on the device list screen 60.

Figure 8A:
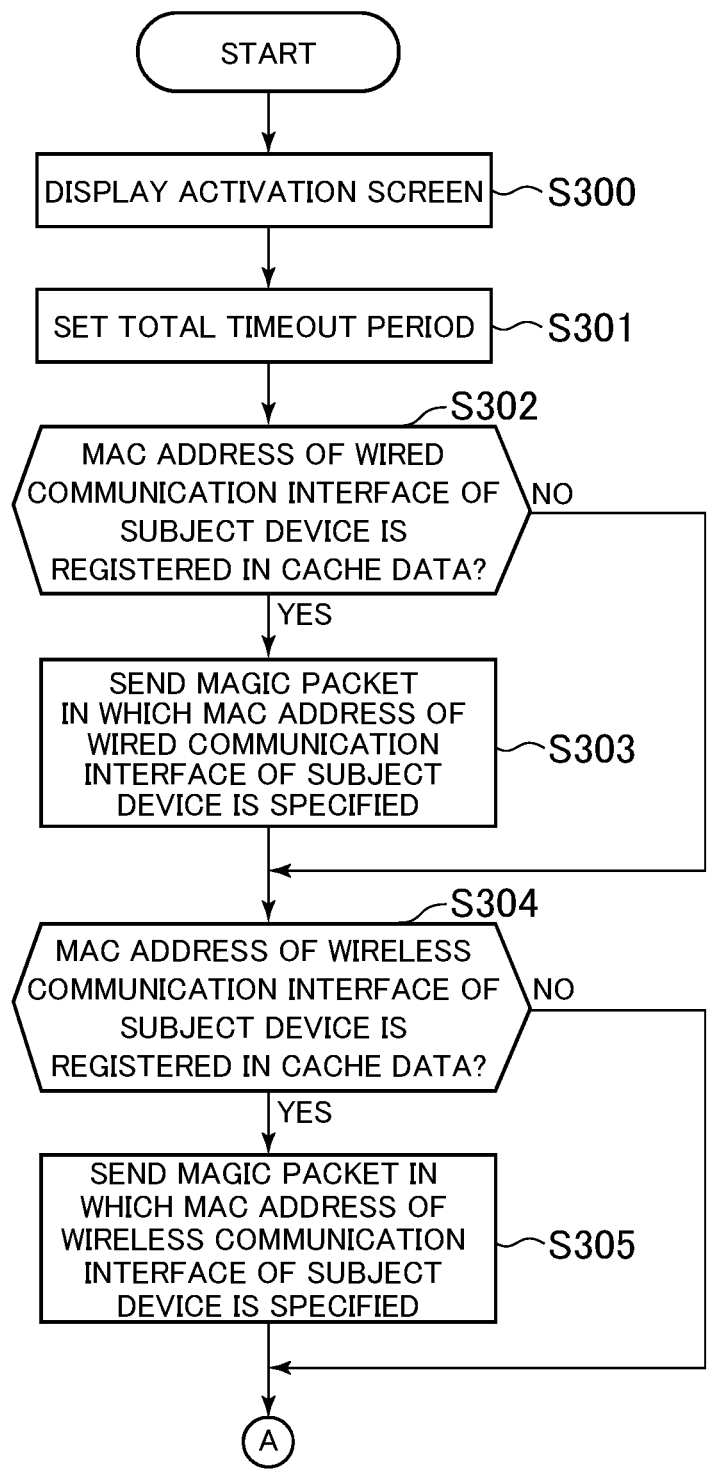
FIG. 8A is a flowchart for illustrating an example of other processing to be executed by the control apparatus.
Figure 8B:
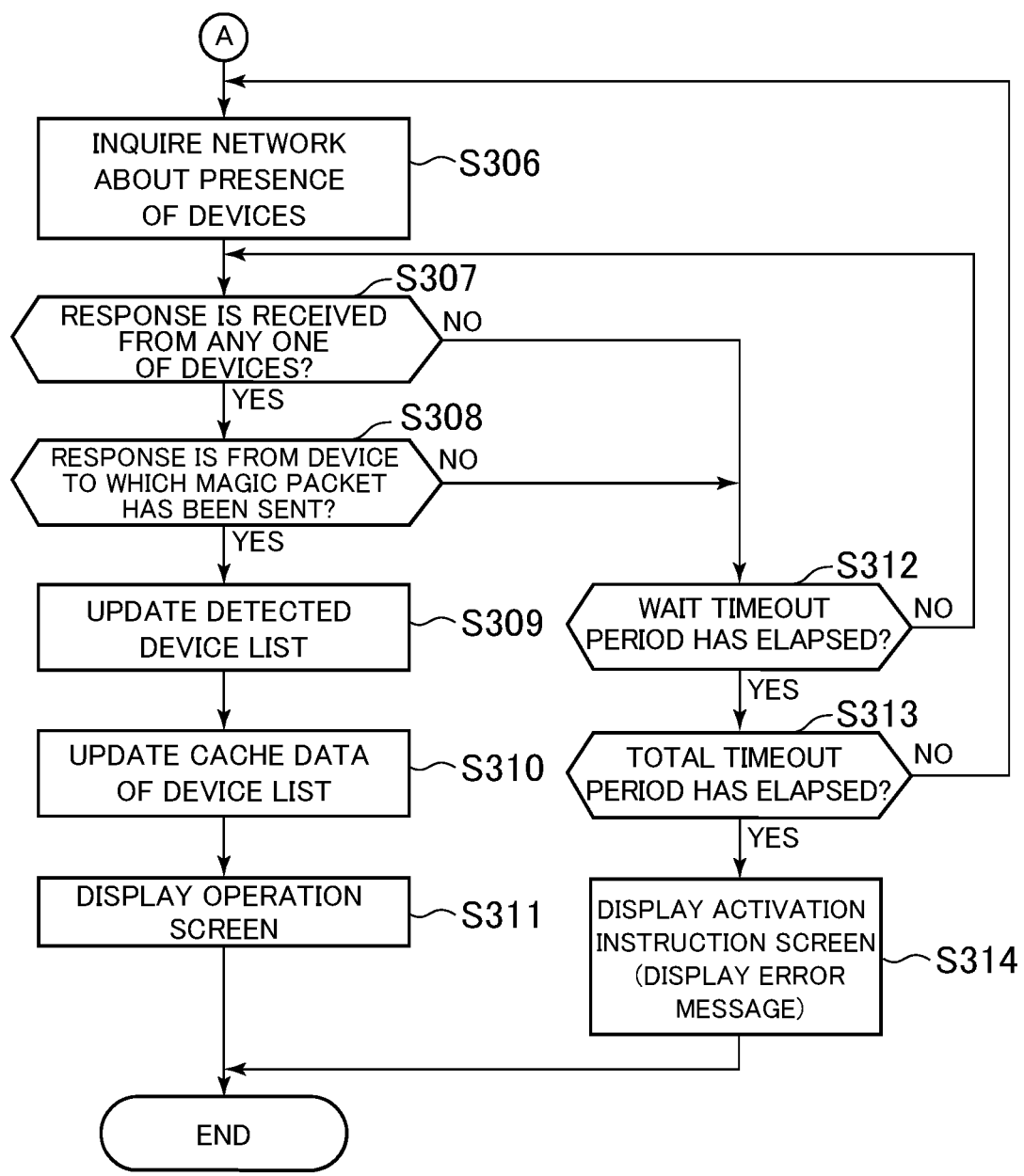
FIG. 8B is a flowchart for illustrating an example of other processing to be executed by the control apparatus.

Next, a description is given of processing to be executed when the power button 71 is selected on the activation instruction screen 70. Specifically, a description is given of processing to be executed when the device 20 in the WOL standby mode is selected as a control target on the device list screen 60, and the power button 71 is selected on the activation instruction screen 70. FIG. 8A and FIG. 8B are each a flowchart for illustrating an example of the processing. The mode control unit 54 and the mode determination unit 55 are implemented by the control unit 11 executing the processing illustrated in FIG. 8A and FIG. 8B in accordance with a program stored in the storage unit 12. In the following, a description is given of the processing illustrated in FIG. 8A and FIG. 8B on the assumption that the device 20C is switched to the power-on mode (that is, on the assumption that the device 20C in the WOL standby mode is selected as a control target and the power button 71 is selected to switch the device 20C to the power-on mode) for the sake of convenience.

As illustrated in FIG. 8A, the control unit 11 first displays the activation screen 80 on the display unit 15 (S300). After that, the control unit 11 sets a total timeout period (S301). The "total timeout period" refers to a timeout period of the entire processing. The total timeout period is set to be longer than the wait timeout period in Step S312 described later. For example, the total timeout period is set to be longer than three times the wait timeout period in Step S312 described later. The significance of setting the total timeout period in this manner is described later.

After the execution of Step S301, the control unit 11 determines whether or not the MAC address of the wired communication interface unit of the device 20C is registered in the cache data (S302). In other words, the control unit 11 determines whether or not the device 20C includes the wired communication interface unit. This determination can be performed by referring to the item "yamaha:X_macAddress-Wired" of the device specific information contained in the cache data.

When the MAC address of the wired communication interface unit of the device 20C is registered in the cache data, the control unit 11 sends a magic packet in which the MAC address of the wired communication interface unit of the device 20C is specified (S303). Specifically, the control unit 11 sends a magic packet in which "FF:FF:FF:FF:FF:FF" (broadcast address of layer 2) is set as the destination address and the MAC address of the wired communication interface unit of the device 20C is repeated 16 times.

After the execution of Step S303, or when it is determined that the MAC address of the wired communication interface unit of the device 20C is not registered in the cache data in Step S302, the control unit 11 determines whether or not the MAC address of the wireless communication interface unit of the device 20C is registered in the cache data (S304). In other words, the control unit 11 determines whether or not the device 20C includes the wireless communication interface unit. This determination can be performed by referring to the item "yamaha:X_macAddressWireless" of the device specific information contained in the cache data.

When the MAC address of the wireless communication interface unit of the device 20C is registered in the cache data (or the detected device list), the control unit 11 sends a magic packet in which the MAC address of the wireless communication interface unit of the device 20C is specified (S305). Specifically, the control unit 11 sends a magic packet in which "FF:FF:FF:FF:FF:FF" (broadcast address of layer 2) is set as the destination address and the MAC address of the wireless communication interface unit of the device 20C is repeated 16 times.

After the execution of Step S305, or it is determined that the MAC address of the wireless communication interface unit of the device 20C is not registered in the cache data in Step S304, the control unit 11 checks whether or not the device 20C has successfully switched to the power-on mode. Specifically, as illustrated in FIG. 8B, the control unit 11 inquires the network about presence of the devices 20 (S306), and monitors whether or not a response is received from any one of the devices 20 (S307). The processing of Steps S306 and S307 is similar to that of Steps S102 and S103 of FIG. 6.

When a response is received from any one of the devices 20, the control unit 11 determines whether or not the received response is a response from the device 20C (the device 20 to which the magic packet has been sent) (S308). This determination is performed by comparing the UUID indicated by the device specific information contained in the response with the UUID indicated by the device specific information of the device 20C contained in the cache data. When the UUID indicated by the device specific information contained in the response is the same as the UUID indicated by the device specific information of the device 20C contained in the cache data, the control unit 11 determines that the received response is a response from the device 20C.

As described above, the case where it is determined that the received response is a response from the device 20C corresponds to the case where the device 20C can perform communication via the TCP/IP protocol, that is, the case where the device 20C has successfully switched to the power-on mode from the WOL standby mode. In this case, the control unit 11 updates the detected device list (S309). Further, the control unit 11 also updates the cache data of the device list (S310). For example, the control unit 11 registers the IP address information of the device 20C with the detected device list and the cache data. After the execution of Steps S309 and S310, the control unit 11 displays the operation screen 90 of the device 20C on the display unit 15 (S311).

When it is determined that no response has been received from any one of the devices 20 in Step S307, or when it is determined that the received response is not a response from the device 20C in Step S308, the control unit 11 determines whether or not the wait timeout period has elapsed (S312). Specifically, the control unit 11 determines whether or not a period of time elapsed since the execution of Step S306 is equal to or more than the wait timeout period.

When the wait timeout period has not elapsed, the control unit 11 continues to perform monitoring to determine whether or not a response is received from any one of the devices 20 (S307). Whereas, when the wait timeout period has elapsed, the control unit 11 stops waiting for a response from any one of the devices 20 and determines whether or not the total timeout period has elapsed (S313). Specifically, the control unit 11 determines whether or not a period of time elapsed since start of the execution of the processing is equal to or more than the total timeout period. When the total timeout period has not elapsed, the control unit 11 again inquires the network about presence of the devices 20 (S306).

The control apparatus 10 sets the total timeout period longer than the wait timeout period, and thus executes the processing of Steps S306 to S308 (processing of checking whether or not the device 20C has successfully switched to the power-on mode) a plurality of times until the total timeout period has elapsed. For example, through setting of the total timeout period longer than three times the wait timeout period, the processing of Steps S306 to Step S308 is executed three times at maximum. It may be erroneously determined that the device 20C has not successfully switched to the power-on mode although the device 20C has successfully switched to the power-on mode in actuality if the control apparatus 10 fails to receive a response from the device 20C due to network congestion or some other causes. However, the control apparatus 10 executes the processing of Steps S306 to S308 a plurality of times, with the result that such troubles are less likely to occur.

Whereas, the case where it is determined in Step S313 that the total timeout period has elapsed corresponds to the case where the control apparatus 10 cannot confirm that the device 20C has successfully switched to the power-on mode by the time when the total timeout period elapses. In this case, the control unit 11 determines that the device 20C has not switched to the power-on mode, and displays the activation instruction screen 70 on the display unit 15 (S314). The control unit 11 displays an error message for indicating failure to switch the device 20C to the power-on mode on the activation instruction screen 70.

According to the control apparatus 10 described above, the user can use the control apparatus 10 to operate the devices 20A to 20D. With the control apparatus 10, even when the device 20 (WOL enabled device) is in a WOL standby mode, the user can switch the device 20 to the power-on mode and start operation of the device 20. In particular, the control apparatus 10 switches the device 20 from the WOL standby mode to the power-on mode based on information (e.g., MAC address) on the device 20 stored as the cache data, and thus the user does not need to look up the MAC address of the device 20 in advance or input the MAC address into the control apparatus 10. Therefore, with the control apparatus 10, it is possible for the user to easily switch the device 20 from the WOL standby mode to the power-on mode. In other words, it is possible to reduce the time and effort for the user to switch the device 20 from the WOL standby mode to the power-on mode.

Further, the control apparatus 10 identifies the device 20 in the WOL standby mode and displays the device 20 on the device list screen 60. Unlike the device 20 in the power-on mode or the network standby mode, the device 20 in the WOL standby mode cannot perform communication via the IP protocol (TCP/IP protocol), and thus the device 20 in the WOL standby mode cannot be identified by a method similar to that for identifying the device 20 in the power-on mode or the network standby mode. In this respect, based on the information on the device 20 stored as the cache data, the control apparatus 10 identifies the device 20 in the WOL standby mode and displays the device 20 on the device list screen 60. As a result, the user can grasp presence of the device 20 in the WOL standby mode.

Further, when the device 20 in the WOL standby mode includes both of the wired communication interface unit and the wireless communication interface unit, the control apparatus 10 sends a magic packet to each of those communication interface units. According to the control apparatus 10, such transmission enables failure of a magic packet to reach the device 20 to less likely to occur, and as a result, the device 20 in the WOL standby mode is less likely to fail to switch to the power-on mode.

Further, the control apparatus 10 sends a magic packet to the device 20 in the WOL standby mode, and then checks whether or not the device 20 has successfully switched to the power-on mode (Steps S306 to S308 of FIG. 8B). If the operation screen 90 is displayed in a state where the device 20 has not switched to the power-on mode, even if the user operates the operation screen 90, the device 20 does not operate as operated by the user, and as a result, the user may feel annoyed. In this respect, according to the control apparatus 10, through checking of the switch as described above, it is possible to prevent the operation screen 90 from being displayed in the state where the device 20 does not become in the power-on mode.

Further, according to the control apparatus 10, even when both of the network standby enabled device and the WOL enabled device exist, the user can operate the device 20 without particularly being aware of the difference between those devices.

The present invention is not limited to the embodiment described above.

(1) The activation instruction screen 70 may be omitted. Specifically, the processing illustrated in FIG. 8A and FIG. 8B may be executed when the device 20 in the WOL standby mode is selected on the device list screen 60 as the control target.

Further, in the embodiment described above, the device 20 in the WOL standby mode is selected as the control target, and then the processing illustrated in FIG. 8A and FIG. 8B is executed. However, the processing illustrated in FIG. 8A and FIG. 8B may be executed before the device 20 in the WOL standby mode is selected as the control target. For example, when displaying the device list screen 60, if there is the device 20 in the WOL standby mode, the processing illustrated in FIG. 8A and FIG. 8B may be executed for the device 20.

(2) In the example described above, the devices 20 to be controlled by the control apparatus 10 include both of the network standby enabled device and the WOL enabled device, but the devices 20 to be controlled by the control apparatus 10 may not include the network standby enabled device. The devices 20 to be controlled by the control apparatus 10 may be only the WOL enabled device.

(3) The device 20 may not be an audio device or an audio visual device. Further, the plurality of devices 20 to be controlled by the control apparatus 10 may not be devices of the same type. The plurality of devices 20 to be controlled by the control apparatus 10 may include devices of different types.

(4) The network between the control apparatus 10 and the device 20 may not include both of the wired LAN 30 and the wireless LAN, and may include any one thereof.

(5) Further, although a case in which the device 20 (WOL enabled device) in the WOL standby mode is switched to the power-on mode has been described in the above, the present invention can be applied to other cases. Specifically, the present invention can also be applied to devices other than the WOL enabled device. The present invention can be applied when a device is switched from a "restriction mode in which a type of communication that can be performed by the device is restricted to a second type of communication, to thereby prohibit control of the device by a first type of communication" to a "controllable mode in which the device can be controlled by the first type of communication".

While there have been described what are at present considered to be certain embodiments of the invention, it will be understood that various modifications may be made thereto, and it is intended that the appended claims cover all such modifications as fall within the true spirit and scope of the invention.

As can be recognized from the description with respect to the embodiments explained above, in this specification, various technical ideas are disclosed that include the invention described below.

A device control method according to one embodiment of the invention is a device control method including: identifying a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and switching, by sending by the second type of communication predetermined data that is based on the device information to the identified device, the identified device from the restriction mode to the controllable mode.

Further, a program according to one embodiment of the invention is a program for causing a computer to: identify a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and switch, by sending by the second type of communication predetermined data that is based on the device information to the identified device, the identified device from the restriction mode to the controllable mode.

Further, an information storage medium according to one embodiment of the invention is a non-transitory computer-readable information storage medium having the above-mentioned program recorded thereon.

Further, a control apparatus according to one embodiment of the invention is a control apparatus including: an identification unit configured to identify a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and a mode control unit configured to switch, by sending by the second type of communication predetermined data that is based on the device information to the identified device, the identified device from the restriction mode to the controllable mode.

Further, a device control system according to one embodiment of the invention is a device control system including: an identification unit configured to identify a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and a mode control unit configured to switch, by sending by the second type of communication predetermined data that is based on the device information to the identified devices, the identified device from the restriction mode to the controllable mode.

According to the above invention, it is possible to easily switch, for example, the WOL enabled device from the standby mode to the normal power-on mode.

Further, in one embodiment of the invention, the identifying may include: identifying a device in the controllable mode by sending a predetermined request to each device contained in the device information by the first type of communication and receiving a response sent from the each device by the first type of communication in response to the predetermined request; and identifying a device that is contained in the device information and that is in the restriction mode based on a result of identifying the device in the controllable mode and the device information.

Further, in one embodiment of the invention, the identifying may include: identifying a device in the controllable mode by sending a predetermined request to each device connected to the network by the first type of communication and receiving a response sent from the each device by the first type of communication in response to the predetermined request; and identifying a device that is contained in the device information and that is in the restriction mode based on a result of identifying the device in the controllable mode and the device information.

Further, in one embodiment of the invention, the device control method may further include: controlling a display to display information on the identified device based on the device information stored in the storage; and receiving a selection operation for selecting the device displayed on the display as a control target, and the switching may include sending, when the identified device is selected as the control target, the predetermined data to the identified device by the second type of communication.

Further, according to the one embodiment of the invention: the device control method may be a method of controlling a first device and a second device via the network; the first device is allowed to be in: the controllable mode; and a first restriction mode in which a type of communication that can be performed by the first device is restricted to the second type of communication through restriction of power supply to the first device, to thereby prohibit control of the first device by the first type of communication; the second device is allowed to be in: the controllable mode; and a second restriction mode in which power supply to the second device is restricted, but the second device can be controlled by the first type of communication; the identifying may include: acquiring a list of the first device in the controllable mode and the second device in one of the controllable mode and the second restriction mode by sending a predetermined request by the first type of communication to at least one of each device contained in the device information and each device connected to the network and receiving a response sent from the at least one of each device contained in the device information and each device connected to the network by the first type of communication in response to the predetermined request; and identifying the first device in the first restriction mode by identifying a device that was in the controllable mode before and that is not contained in the list; the controlling may include controlling the display to display information on the first device in the controllable mode, information on the second device in one of the controllable mode and the second restriction mode, and information on the first device in the first restriction mode; and the switching may include: switching, when the second device in the second restriction mode is selected as the control target, the selected second device from the second restriction mode to the controllable mode by sending second predetermined data to the selected second device by the first type of communication; and switching, when the first device in the first restriction mode is selected as the control target, the selected first device from the first restriction mode to the controllable mode by sending first predetermined data that is based on the device information to the selected first device by the second type of communication.

Further, according to the one embodiment of the invention: the device may have at least one of a wired communication function capable of performing the first type of communication and the second type of communication via a wired network or a wireless communication function capable of performing the first type of communication and the second type of communication via a wireless network; the device information may include information on whether or not the device that was in the controllable mode before has the wired communication function and information on whether or not the device that was in the controllable mode before has the wireless communication function; and the switching may include sending, when the identified device has both of the wired communication function and the wireless communication function, the predetermined data to the identified device by both of the second type of communication using the wired communication function and the second type of communication using the wireless communication function.

Further, in one embodiment of the invention, the device control method may further include: sending, after the predetermined data is sent to the identified device by the second type of communication at the switching, a predetermined request to each device connected to the network by the first type of communication and receiving a response sent from the each device by the first type of communication in response to the predetermined request; and determining whether or not the response is a response from the identified device, to thereby determine whether or not the identified device has switched to the controllable mode.

Further, in one embodiment of the invention: the controllable mode may be a mode in which information on the device can be acquired from the device and the device can be controlled by the first type of communication; and the restriction mode may be a mode in which a type of communication that can be performed by the device is restricted to the second type of communication through restriction of power supply to the device, to thereby prohibit acquisition of the information on the device from the device and control of the first device by the first type of communication.

What is claimed is:

1. A device control method comprising:
   identifying a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and
   switching, by sending, by the second type of communication, a predetermined data that is based on the device information to the identified device, the identified device from the restriction mode to the controllable mode;
   wherein the device control method comprises a method of controlling a first device and a second device via the network,
   wherein the first device is allowed to be in:
      the controllable mode; and
      a first restriction mode in which a type of communication that can be performed by the first device is restricted to the second type of communication through restriction of power supply to the first device, to thereby prohibit control of the first device by the first type of communication,
   wherein the second device is allowed to be in:
      the controllable mode; and
      a second restriction mode in which power supply to the second device is restricted, but the second device can be controlled by the first type of communication,
   wherein the identifying comprises:
      acquiring a list of the first device in the controllable mode and the second device in one of the controllable mode and the second restriction mode by sending a predetermined request by the first type of communication to at least one of each device contained in the device information and each device connected to the network and receiving a response sent from the at least one of each device contained in the device information and each device connected to the network by the first type of communication in response to the predetermined request; and
      identifying the first device in the first restriction mode by identifying a device that was in the controllable mode before and that is not contained in the list, and
   wherein the switching comprises:
      switching, when the second device in the second restriction mode is selected as a control target by a user, the selected second device from the second restriction mode to the controllable mode by sending second predetermined data to the selected second device by the first type of communication; and
      switching, when the first device in the first restriction mode is selected as the control target, the selected first device from the first restriction mode to the controllable mode by sending first predetermined data that is based on the device information to the selected first device by the second type of communication.

2. The device control method according to claim 1, wherein the identifying comprises:
   identifying the device in the controllable mode by sending the predetermined request to each device contained in the device information by the first type of communication and receiving the response sent from the each device by the first type of communication in response to the predetermined request; and
   identifying a device that is contained in the device information and that is in the restriction mode based on a result of identifying the device in the controllable mode and the device information.

3. The device control method according to claim 1, wherein the identifying comprises:
   identifying the device in the controllable mode by sending the predetermined request to each device connected to the network by the first type of communication and receiving the response sent from the each device by the first type of communication in response to the predetermined request; and
   identifying a device that is contained in the device information and that is in the restriction mode based on a result of identifying the device in the controllable mode and the device information.

4. The device control method according to claim 1, further comprising:
controlling a display to display information on the identified device based on the device information; and
receiving a selection operation for selecting the device displayed on the display as the control target,
wherein the switching comprises sending, when the identified device is selected as the control target, the predetermined data to the identified device by the second type of communication.

5. The device control method according to claim 4,
wherein the controlling comprises controlling the display to display information on the first device in the controllable mode, information on the second device in one of the controllable mode and the second restriction mode, and information on the first device in the first restriction mode.

6. The device control method according to claim 1,
wherein the device has at least one of a wired communication function capable of performing the first type of communication and the second type of communication via a wired network or a wireless communication function capable of performing the first type of communication and the second type of communication via a wireless network,
wherein the device information comprises information on whether or not the device that was in the controllable mode before has the wired communication function and information on whether or not the device that was in the controllable mode before has the wireless communication function, and
wherein the switching comprises sending, when the identified device has both of the wired communication function and the wireless communication function, the predetermined data to the identified device by both of the second type of communication using the wired communication function and the second type of communication using the wireless communication function.

7. The device control method according to claim 1, further comprising:
sending, after the predetermined data is sent to the identified device by the second type of communication at the switching, the predetermined request to each device connected to the network by the first type of communication and receiving the response sent from the each device by the first type of communication in response to the predetermined request; and
determining whether or not the response is received from the identified device, to thereby determine whether or not the identified device has switched to the controllable mode.

8. The device control method according to claim 1,
wherein the controllable mode comprises a mode in which information on the device can be acquired from the device and the device can be controlled by the first type of communication, and
wherein the restriction mode comprises a mode in which a type of communication that can be performed by the device is restricted to the second type of communication through restriction of power supply to the device, to thereby prohibit acquisition of the information on the device from the device and control of the first device by the first type of communication.

9. A control apparatus comprising:
at least one processor; and
at least one memory that stores a plurality of instructions, which when executed by the at least one processor, cause the at least one processor to:
identify a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and
switch, by sending, by the second type of communication, a predetermined data that is based on the device information to the identified device, the identified device from the restriction mode to the controllable mode;
wherein the control apparatus controls a first device and a second device via the network,
wherein the first device is allowed to be in:
the controllable mode; and
a first restriction mode in which a type of communication that can be performed by the first device is restricted to the second type of communication through restriction of power supply to the first device, to thereby prohibit control of the first device by the first type of communication,
wherein the second device is allowed to be in:
the controllable mode; and
a second restriction mode in which power supply to the second device is restricted, but the second device can be controlled by the first type of communication,
wherein the plurality of instructions causes the at least one processor to:
acquire a list of the first device in the controllable mode and the second device in one of the controllable mode and the second restriction mode by sending a predetermined request by the first type of communication to at least one of each device contained in the device information and each device connected to the network and receiving a response sent from the at least one of each device contained in the device information and each device connected to the network by the first type of communication in response to the predetermined request;
identify the first device in the first restriction mode by identifying a device that was in the controllable mode before and that is not contained in the list;
switch, when the second device in the second restriction mode is selected as a control target by a user, the selected second device from the second restriction mode to the controllable mode by sending second predetermined data to the selected second device by the first type of communication; and
switch, when the first device in the first restriction mode is selected as the control target, the selected first device from the first restriction mode to the controllable mode by sending first predetermined data that is based on the device information to the selected first device by the second type of communication.

10. The control apparatus according to claim 9,
wherein the plurality of instructions causes the at least one processor to:
identify the device in the controllable mode by sending the predetermined request to each device contained in the device information by the first type of communication and receiving the response sent from the each device by the first type of communication in response to the predetermined request; and identify a device that is contained in the device information and that is in the restriction mode based on a result of identifying the device in the controllable mode and the device information.

11. The control apparatus according to claim 9, wherein the plurality of instructions causes the at least one processor to:

identify the device in the controllable mode by sending the predetermined request to each device connected to the network by the first type of communication and receiving the response sent from the each device by the first type of communication in response to the predetermined request; and identify a device that is contained in the device information and that is in the restriction mode based on a result of identifying the device in the controllable mode and the device information.

12. The control apparatus according to claim 9, wherein the plurality of instructions causes the at least one processor to:

control a display to display information on the identified device based on the device information;

receive a selection operation for selecting the device displayed on the display as the control target; and send, when the identified device is selected as the control target, the predetermined data to the identified device by the second type of communication, to thereby switch the identified device from the restriction mode to the controllable mode.

13. The control apparatus according to claim 12, wherein the plurality of instructions causes the at least one processor to:

control the display to display information on the first device in the controllable mode, information on the second device in one of the controllable mode and the second restriction mode, and information on the first device in the first restriction mode.

14. The control apparatus according to claim 9, wherein the device has at least one of a wired communication function capable of performing the first type of communication and the second type of communication via a wired network or a wireless communication function capable of performing the first type of communication and the second type of communication via a wireless network, wherein the device information comprises information on whether or not the device that was in the controllable mode before has the wired communication function and information on whether or not the device that was in the controllable mode before has the wireless communication function, and wherein the plurality of instructions causes the at least one processor to send, when the identified device has both of the wired communication function and the wireless communication function, the predetermined data to the identified device by both of the second type of communication using the wired communication function and the second type of communication using the wireless communication function, to thereby switch the identified device from the restriction mode to the controllable mode.

15. The control apparatus according to claim 9, wherein the plurality of instructions further causes the at least one processor to:

send, after the predetermined data is sent to the identified device by the second type of communication, the predetermined request to each device connected to the network by the first type of communication and receiving the response sent from the each device by the first type of communication in response to the predetermined request; and determine whether or not the response is received from the identified device, to thereby determine whether or not the identified device has switched to the controllable mode.

16. The control apparatus according to claim 9, wherein the controllable mode comprises a mode in which information on the device can be acquired from the device and the device can be controlled by the first type of communication, and wherein the restriction mode comprises a mode in which a type of communication that can be performed by the device is restricted to the second type of communication through restriction of power supply to the device, to thereby prohibit acquisition of the information on the device from the device and control of the first device by the first type of communication.

17. A device control system comprising:

at least one processor; and at least one memory that stores a plurality of instructions, which when executed by the at least one processor, cause the at least one processor to:

identify a device contained in device information on a device that was in a controllable mode before, the device being controlled via a network and being allowed to be in the controllable mode and a restriction mode, the controllable mode being a mode in which the device can be controlled by a first type of communication via the network, and the restriction mode being a mode in which a type of communication that can be performed by the device is restricted to a second type of communication to thereby prohibit control of the device by the first type of communication; and switch, by sending, by the second type of communication, a predetermined data that is based on the device information to the identified device, the identified device from the restriction mode to the controllable mode;

wherein the device control system controls a first device and a second device via the network, wherein the first device is allowed to be in:
  the controllable mode; and
  a first restriction mode in which a type of communication that can be performed by the first device is restricted to the second type of communication through restriction of power supply to the first device, to thereby prohibit control of the first device by the first type of communication, wherein the second device is allowed to be in:
  the controllable mode; and
  a second restriction mode in which power supply to the second device is restricted, but the second device can be controlled by the first type of communication, wherein the plurality of instructions causes the at least one processor to:

acquire a list of the first device in the controllable mode and the second device in one of the controllable mode and the second restriction mode by sending a predetermined request by the first type of communication to at least one of each device contained in the device information and each device connected to the network and receiving a response sent from the at least one of each device contained in the device information and each device connected to the network by the first type of communication in response to the predetermined request;

identify the first device in the first restriction mode by identifying a device that was in the controllable mode before and that is not contained in the list;

switch, when the second device in the second restriction mode is selected as a control target by a user, the selected second device from the second restriction mode to the controllable mode by sending second predetermined data to the selected second device by the first type of communication; and switch, when the first device in the first restriction mode is selected as the control target, the selected first device from the first restriction mode to the controllable mode by sending first predetermined data that is based on the device information to the selected first device by the second type of communication.

18. The device control system according to claim 17, wherein the plurality of instructions causes the at least one processor to:

identify the device in the controllable mode by sending the predetermined request to each device contained in the device information by the first type of communication and receiving the response sent from the each device by the first type of communication in response to the predetermined request; and identify a device that is contained in the device information and that is in the restriction mode based on a result of identifying the device in the controllable mode and the device information.

19. The device control system according to claim 17, wherein the plurality of instructions causes the at least one processor to:

identify the device in the controllable mode by sending the predetermined request to each device connected to the network by the first type of communication and receiving the response sent from the each device by the first type of communication in response to the predetermined request; and identify a device that is contained in the device information and that is in the restriction mode based on a result of identifying the device in the controllable mode and the device information.

20. The device control system according to claim 17, wherein the plurality of instructions causes the at least one processor to:

control a display to display information on the identified device based on the device information;

receive a selection operation for selecting the device displayed on the display as the control target; and send, when the identified device is selected as the control target, the predetermined data to the identified device by the second type of communication, to thereby switch the identified device from the restriction mode to the controllable mode.

* * * * *